United States Patent
Redlingshöfer et al.

(10) Patent No.: US 7,344,649 B2
(45) Date of Patent: Mar. 18, 2008

(54) CATALYTIC REMOVAL OF DISSOLVED OXYGEN FROM ORGANIC LIQUIDS

(75) Inventors: Hubert Redlingshöfer, Münchsteinach (DE); Andreas Dörflein, Langen (DE); Christoph Weckbecker, Gründau (DE)

(73) Assignee: Degussa AG, Düsseldorf (DE)

(*) Notice: Subject to any disclaimer, the term of this patent is extended or adjusted under 35 U.S.C. 154(b) by 344 days.

(21) Appl. No.: 11/106,088

(22) Filed: Apr. 14, 2005

(65) Prior Publication Data

US 2005/0230322 A1 Oct. 20, 2005

(30) Foreign Application Priority Data

Apr. 14, 2004 (DE) .................... 10 2004 017 983

(51) Int. Cl.
*C02F 1/70* (2006.01)
(52) U.S. Cl. ........................................ 210/757; 60/288
(58) Field of Classification Search ................ 210/757, 210/668, 669; 438/257; 208/89; 518/728; 585/240; 60/288
See application file for complete search history.

(56) References Cited

U.S. PATENT DOCUMENTS 3,095,367 A * 6/1963 Kline et al. .................... 208/89
4,304,761 A * 12/1981 Yu Yao .................... 423/213.2
4,859,435 A * 8/1989 Roberts et al. ............. 423/219
2006/0196174 A1* 9/2006 Lamm et al. ................. 60/288

FOREIGN PATENT DOCUMENTS

WO WO 85/02173 5/1985
WO WO 01/85622 A1 11/2001

OTHER PUBLICATIONS

Extraction and Qualtitative Analysis of Elemental sulfer, Environ. Sci. Technol. 2000, 35, 4651-4655.*
Moon, Jeon-Soo et al., "A Study on the Application of a New Dissolved Oxygen Removal System Using Activated Carbon Fiber Cartridge Catalyst," Official Proceedings—International Water Conference, 2000, vol. 61, pp. 188-204, XP008050162.

* cited by examiner

*Primary Examiner*—Walter D. Griffin
*Assistant Examiner*—Cameron J Allen
(74) *Attorney, Agent, or Firm*—Robert G. Weilacher; Smith, Gambrell & Russell

(57) ABSTRACT

A method for removal of dissolved oxygen from organic liquids by use of a solid state catalyst. In doing so the dissolved oxygen is converted by the action of a reducing agent into water.

24 Claims, No Drawings

CATALYTIC REMOVAL OF DISSOLVED OXYGEN FROM ORGANIC LIQUIDS

INTRODUCTION AND BACKGROUND

The present invention relates to a method for removal of dissolved oxygen from organic liquids by use of a solid state catalyst. In doing so the dissolved oxygen is converted by the action of a reducing agent to water.

The presence of dissolved oxygen in organic liquids which are utilized in chemical processes in extremely large amounts of several metric tons per hour can lead to corrosion of equipment parts or to unwanted side reactions with other input materials. Because of the high throughputs, oxygen amounts in the ppm range are sufficient for that to occur. In most chemical processes high temperatures and pressures exist, enabling the occurrence of unwanted reactions between dissolved oxygen and other input materials.

The removal of dissolved oxygen from water is already known (K. Matt, Chemie-Technik, 20 (10), 44-45, 1991/A. Brehm, U. Antons, Reduction of Oxygen Dissolved in Water by Means of a Fluidized Bed Reactor, Chemie Ingenieur Technik 70 (1+2), 176-181, 1998). This action is utilized mainly to prevent the corrosion of piping runs and apparatus in water circuits.

A catalytic method for removal of oxygen from sea water which was utilized subsequently in subterranean oil reservoirs is described in WO 01/85622.

As a matter of principle in oxygen removal physical and chemical methods are to be differentiated. Among physical methods are thermal degassing, stripping, gas removal by means of evacuation or combinations of these methods. Physical methods are of course characterized by having high investment costs and considerable energy consumption for large throughputs. Nevertheless the remaining oxygen concentrations are still frequently too high.

On these grounds chemical methods for removal of oxygen from water are also utilized. Thus after addition of hydrazine oxygen reacts completely to produce water and nitrogen. However, hydrazine is poisonous, is strongly endangering to water, is corrosive and may be involved with unwanted side reactions with other materials. Additionally, chemical methods are known which make use of sodium sulfite or amines.

For chemical removal of oxygen from water catalytic methods using different catalysts in the presence of reducing agents such as hydrogen can also be employed (J.-S. Moon, K.-K. Park, S.-W. Yun, G. Seo, A study on the Application of a New Dissolved Oxygen Removal System Using Activated Carbon Fiber Cartridge Catalyst, Official Proceedings—International Water Conference 61, 186-204, 2000).

The state of the art of the removal of oxygen from organic liquids has not been described. Should one wish to remove dissolved oxygen from an organic liquid, it must be insured beforehand that as a result of the catalyst or the reducing agent no chemical reaction takes place with the organic liquid that leads to the formation of unwanted byproducts. This could dramatically interfere with the entire course of the production. On the other hand the organic liquid to be treated must not deactivate the catalyst that is being used, which can for example cause the formation of sediment. Furthermore if the solubility of oxygen is greater in the organic liquids than in water and consequently the amount to be removed is also significantly higher. For instance, oxygen dissolves about 10 times better in methanol than in water (J. Tokunaga, Solubilities of Oxygen Nitrogen and Carbon Dioxide in Aqueous Alcohol Solutions, J. Chem. Eng. Data 20, 1, 41-46, 1975, and K. Fischer, M. Wilkens, J. Chem. Thermodynamics, 33, 1285-1308, 2001). As a result, very active catalysts must be employed, which moreover in the preferred embodiment convert the oxygen to for example water without heat input at room or ambient temperature.

Aggravatingly, in the removal of oxygen from organic liquids, there is also the fact that in chemical processes these are not present as a pure substance, but mostly contain a small amount of other organic and/or inorganic substances, which likewise are not inert. In known purification methods according to the state of the art water on the other hand is mainly utilized in separate heating and cooling circuits without contact with other media.

When mixtures of several different substances are present in chemical plants the removal of dissolved oxygen from the organic liquids can be especially required, if the mixtures can give rise to unwanted side reactions with oxygen. For example, the dissolved oxygen in an organic liquid can upon contact with sulfur-containing compounds at higher temperature cause the oxidation of these compounds to bring about formation of elemental sulfur. This can have fatal consequences, if elementary sulfur is deposited as a solid and plugs equipment parts. By removal of dissolved oxygen, higher availability of the installations are achieved, which is of enormous economic interest. Additionally plant safety is also enhanced since operation with dangerous material is not a factor interfering with operation of the plant.

Moreover the input of dissolved oxygen into installations can lead to the formation of explosive mixtures with organic compounds, in case the oxygen that is brought in, for example through degassing becomes enriched in parts of the installation and comes into contact with organic compounds.

The object of the present invention is to provide a method for the catalytic removal of dissolved oxygen from organic liquids, so that the undesirable side reactions and safety-related dangerous plant conditions are avoided.

In order to remove dissolved oxygen as cost-effectively as possible, preferably the method should work at room or ambient temperature without thermal treatment. Additionally the dissolved oxygen should be almost completely removed from the organic liquid.

SUMMARY OF THE INVENTION

This object is solved by means of the following procedure: In a first step, the reducing agent, preferably hydrogen is introduced into the organic liquid. The way and type of the introduction of the reducing agent is not decisive for the effectiveness of the method, so long as a sufficient material exchange between organic liquid and reducing agent is ensured. Thus introduction of the reducing agent can be carried out by different means, such as, for example, by a static mixer, a bubble column, a falling-film absorber, a packing material or packing column, or a radiator.

The amount of the reaction means must be measured so that it is at least sufficient for reduction of the oxygen that is present.

If more gaseous reducing agent is employed than dissolves in the liquid then in a preferred embodiment, the excess portion should be removed before contact of the reducing agent-saturated organic liquid with the catalyst. This can, for example be carried out through a simple gas-liquid separation. In this embodiment, already a part of the dissolved oxygen is removed along with the excess reducing agent.

Subsequently, the organic liquid and the reducing agent contained therein are brought into contact with a suitable catalyst. This is especially carried out in known reactors with a catalyst in solid form, preferably in fixed bed reactors, in which the catalyst is loaded.

In another embodiment of the invention the reducing agent can also, without prior entry into the organic liquid, be brought into the reactor into direct contact with the organic liquid and with the catalyst. This lowers the equipment expenditure of the method.

In a preferred embodiment of the method, no additional heat is provided in any of the steps. The method is preferably operated continuously at room or ambient temperature. The method can be operated at reduced pressure, atmospheric pressure or over-pressure. Preferably pressures from atmospheric pressure to 100 bar are applied.

The necessarily very active hydrogenation catalyst must however behave completely inertly to the organic liquid. On the other hand the organic liquid should not deactivate the catalyst. Commercially available noble metal and transition metal catalysts are found to be especially suitable, preferably supported noble metal catalysts, especially preferred are Pd-containing catalysts with carriers of aluminum oxide, active carbon, silica, or resins. The grain size of the catalysts utilized are preferably between 0.2 mm and 10 cm. Likewise the catalyst can be present in the form of a coating on the wall, on components or on carriers. If the input of the reducing agent or the mixture of the reducing agent with the organic liquid and the conversion of dissolved oxygen is carried out in an apparatus, the use of a static mixer that is coated with Pd-containing catalyst is also useful.

As organic compounds the known solvents or their mixtures are suitable, which—in case they are unsaturated—do not get hydrogenated under the test conditions.

Particularly suitable are branched or unbranched aliphatic alcohols, having 1 to 12 C atoms, cyclic or non-cyclic aliphatics, ethers having alkyl groups with 1 to 5 C atoms as well as aromatic hydrocarbons with and without substituents.

Typical organic liquids are for example methanol, ethanol, isopropanol, acetone, cyclohexanol, cyclohexane, ethyl acetate, dimethylformamide, benzene, toluene, or xylene. The term organic compounds is not however limited to organic solvents.

The method in accordance with the invention proves itself to be especially advantageous when the dissolved oxygen is essentially removed from liquid organic compounds and they are subsequently brought into contact with sulfur containing organic compounds or liquids containing them or gaseous mixtures. In these cases elementary sulfur is no longer deposited, especially when $H_2S$ is fed in.

It is shown that organic liquids treated at room temperature according to this catalytic method can be almost entirely freed of dissolved oxygen (<100 ppb, especially 80 ppb to 0 ppb). The preferably used Pd-containing catalysts are active enough to remove oxygen dissolved in organic compounds at room temperature. Even impurities in organic compounds do not hinder the effectiveness of the method.

The oxygen removal on the one hand was able to be proved analytically by online measurements of the oxygen current after use of the catalyst (principle: Clark Cell). On the other hand for objective evidence of dissolved oxygen in the organic liquid treated according to this method, other chemicals (process-related as in chemical installations) such as for example hydrogen sulfide can be added. Whether the oxidation with oxygen to elementary sulfur occurs can then be checked by means of HPLC analysis of the organic liquid for elemental sulfur.

DETAILED DESCRIPTION OF THE INVENTION

EXAMPLES

Comparison Example 4 l/h of methanol was continuously dosed into a glass flask by means of a pump. Into the vessel furthermore a stream of nitrogen is fed at 3.0 l/h through a frit. The mixture was then passed through a 200 ml column, which was filled with glass beads. Following that the gas was separated by phase separation in another flask. The entire assembly was operated at room temperature and atmospheric pressure.

By means of an oxygen measurement probe the dissolved oxygen content was determined to be 35 ppm at the exit from the column. The oxygen concentration in the methanol utilized was 70 ppm.

Example 1

4 l/h of methanol was continuously dosed into a glass flask by means of a pump. Furthermore a stream of hydrogen was fed through a frit into the vessel at 1.0 l/h. The mixture was then passed through a 200 ml column, which was filled with glass beads. Following that the excess gas was separated by phase separation in another flask. The hydrogen-containing methanol was then pumped at 4 l/h into a fixed bed reactor, which was filled with 70 g of catalyst (0.5 wt % Pd on $\gamma$-$Al_2O_3$)

By means of an oxygen measurement probe the dissolved oxygen content was determined to be 80 ppb at the exit from the reactor. The oxygen concentration in the methanol utilized however was 70 ppm.

7 g of hydrogen sulfide was flowed through 200 ml of methanol freed of dissolved oxygen, so that no elemental sulfur could be detected (<1 ppm) by means of HPLC analysis. By use of untreated methanol, in contrast more than 40 ppm of elemental sulfur formed.

Example 2

Example 1 was repeated with a stream of 5 l/h methanol that contained small amounts of impurities (amines and sulfur compounds), and 69.5 g of a Pd-containing catalyst (Lewatit K3433, Bayer AG, supported on an ion exchange resin.

The dissolved oxygen content was determined by means of an oxygen measurement probe to be 0 ppb at the exit of the reactor.

Example 3

Example 2 was repeated with a modified assembly. Thus, for the entry of hydrogen a falling film absorber was used, where the methanol containing small amounts of impurities flowed from top to bottom in the form of a thin film along the inner tube wall in a hydrogen atmosphere. In addition a hydrogen exit was dispensed with.

The dissolved oxygen content was determined to be 0.5 ppb by means of an oxygen measuring probe at the outlet of the reactor.

Example 4

Example 1 was repeated with a stream of 5 l/h of cyclohexane. By means of an oxygen measuring probe, the dissolved oxygen content at the reactor exit was determined to be 55 ppb.

Example 5

Example 1 was repeated with a stream of 5 l/h of toluene. By means of an oxygen measuring probe, the dissolved oxygen content at the reactor exit was determined to be 20 ppb.

Example 6

Example 1 was repeated with a stream of 3 l/h of acrolein. By means of an oxygen measuring probe, the dissolved oxygen content at the reactor exit was determined to be 100 ppb.

Example 7

Example 1 was repeated with a stream of 3 l/h of acetone. By means of an oxygen measuring probe, the dissolved oxygen content at the reactor exit was determined to be 50 pbb.

Further variations and modifications of the foregoing will be apparent to those skilled in the art and are intended to be encompassed by the claims appended hereto.

German priority application 10 2004 017 983.2 filed Apr. 14, 2004, is relied on and incorporated herein by reference.

The invention claimed is:

1. A method for removal of dissolved oxygen from an organic liquid comprising contacting a reducing agent with the organic liquid, in the presence of a catalyst whereby dissolved oxygen is converted to water.

2. The method in accordance with claim 1 for the catalytic removal of dissolved oxygen comprising
   a) introducing the reducing agent into the organic liquid,
   b) removing if necessary any insoluble excess of the reducing agent,
   c) reacting dissolved oxygen with the reducing agent on a catalyst.

3. The method in accordance with claim 1, characterized in that the reducing agent is fed directly over the catalyst.

4. The method in accordance with claim 2, characterized in that no more reducing agent is added than dissolves in the organic liquid.

5. The method in accordance with claim 2, characterized in that the reducing agent is absorbed in the organic liquid.

6. The method in accordance with claim 2, characterized in that excess of reducing agent is separated by a gas-liquid phase separation.

7. The method in accordance with claim 1, characterized in that conversion of dissolved oxygen with the reducing agent is carried out in a fixed bed loaded with catalyst.

8. The method in accordance with claim 2, characterized in that conversion of dissolved oxygen with the reducing agent is carried out in a fixed bed loaded with catalyst.

9. The method in accordance with claim 1, characterized in that catalytic removal of dissolved oxygen takes place at room or ambient temperature.

10. The method in accordance with claim 2, characterized in that catalytic removal of dissolved oxygen takes place at room or ambient temperature.

11. The method in accordance with claim 1, characterized in that the method is operated continuously.

12. The method in accordance with claim 2, characterized in that the method is operated continuously.

13. The method in accordance with claim 1, characterized in that the reducing agent is hydrogen.

14. The method in accordance with claim 2, characterized in that the reducing agent is hydrogen.

15. The method in accordance with claim 1, characterized in that the catalyst is a noble metal containing solid material.

16. The method in accordance with claim 2, characterized in that the catalyst is a noble metal containing solid material.

17. The method in accordance with claim 1, characterized in that the catalyst is a Pd-containing material.

18. The method in accordance with claim 2, characterized in that the catalyst is a Pd-containing material.

19. The method in accordance with claim 1, characterized in that the organic liquid is an organic solvent or a mixture of solvents.

20. The method in accordance with claim 2, characterized in that the organic liquid is an organic solvent or a mixture of solvents.

21. The method in accordance with claim 1, characterized in that methanol is the organic liquid.

22. The method in accordance with claim 2, characterized in that methanol is the organic liquid.

23. The method in accordance with claim 1, further comprising bringing the organic liquid essentially freed of dissolved oxygen into contact with a sulfur containing inorganic or organic compound or mixtures thereof.

24. The method in accordance with claim 2, further comprising bringing the organic liquid essentially freed of dissolved oxygen into contact with a sulfur containing inorganic or organic compound or mixtures thereof.

\* \* \* \* \*